(12) United States Patent
Zellner et al.

(10) Patent No.: US 7,664,509 B2
(45) Date of Patent: *Feb. 16, 2010

(54) LOCATION BLOCKING SERVICE FOR WIRELESS NETWORKS

(75) Inventors: Samuel N. Zellner, Dunwoody, GA (US); Mark J. Enzmann, Roswell, GA (US); Robert T. Moton, Jr., Alpharetta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 211 days.

This patent is subject to a terminal disclaimer.

(21) Appl. No.: 10/704,775

(22) Filed: Nov. 12, 2003

(65) Prior Publication Data

US 2004/0097243 A1 May 20, 2004

Related U.S. Application Data

(63) Continuation of application No. 09/606,534, filed on Jun. 30, 2000, now Pat. No. 6,675,017.

(51) Int. Cl.
*H04W 24/00* (2009.01)
(52) U.S. Cl. .................. 455/456.1; 455/404.2; 455/445
(58) Field of Classification Search ............... 455/456.1, 455/456.7, 456.4, 410, 413; 342/352.12, 342/449, 388
See application file for complete search history.

(56) References Cited

U.S. PATENT DOCUMENTS

| 4,445,118 A | 4/1984 | Taylor et al. |
| 4,757,267 A | 7/1988 | Riskin |

(Continued)

FOREIGN PATENT DOCUMENTS

EP 000964542 A2 12/1999 ............... 705/14 X (Continued)

OTHER PUBLICATIONS

Petronis, Scott, "Mapping Technology: The Common Thread," Wireless Review, vol. 17, No. 3, pp. 10-14, Feb. 1, 2000, ISSN: 1099-9248.

(Continued)

*Primary Examiner*—David Q Nguyen
(74) *Attorney, Agent, or Firm*—Parks IP Law LLC; Jonathan A. Paulis

(57) ABSTRACT

The invention disclosed is a location blocking service for use in a wireless network that tracks the location and identity of network users, such as networks complying with enhanced 911 standards. The service provides a network user with the ability to prevent the location of her wireless handheld device from being disclosed to parties other than the wireless network provider and PSAPs (Public Safety Answering Points). The network user blocks the forwarding of location information by signaling to the wireless handheld device when the location information originates from the wireless handheld device, or by signaling to the network when the location information originates from the wireless handheld device or the network. Primary components of the present invention include at least one user interface and at least one location block processor provisioned in the wireless handheld device and/or the wireless network. The user interface prompts the user of the handheld device to enter the commands that send the signals to the device or network.

17 Claims, 4 Drawing Sheets

U.S. PATENT DOCUMENTS

| | | | |
|---|---|---|---|
| 5,303,393 A | 4/1994 | Noreen et al. | |
| 5,321,242 A | 6/1994 | Heath, Jr. | 235/382 |
| 5,444,444 A | 8/1995 | Ross | 340/994 |
| 5,451,757 A | 9/1995 | Heath, Jr. | 340/5.4 |
| 5,511,111 A | 4/1996 | Serbetcioglu et al. | |
| 5,512,908 A | 4/1996 | Herrick | |
| 5,528,248 A | 6/1996 | Steiner et al. | |
| 5,566,235 A | 10/1996 | Hetz | |
| 5,588,042 A | 12/1996 | Comer | |
| 5,596,625 A | 1/1997 | LeBlanc | |
| 5,610,973 A | 3/1997 | Comer | |
| 5,625,364 A | 4/1997 | Herrick et al. | |
| 5,657,375 A | 8/1997 | Connolly et al. | |
| 5,663,734 A | 9/1997 | Krasner | |
| 5,694,453 A | 12/1997 | Fuller et al. | 340/825.49 |
| 5,701,301 A | 12/1997 | Weisser, Jr. | |
| 5,712,899 A | 1/1998 | Pace, II | |
| 5,713,075 A | 1/1998 | Threadgill et al. | 455/427 |
| 5,720,033 A | 2/1998 | Deo | 726/2 |
| 5,727,057 A | 3/1998 | Emery et al. | |
| 5,771,283 A | 6/1998 | Chang et al. | |
| 5,794,210 A | 8/1998 | Goldhaber et al. | 705/14 |
| 5,812,763 A | 9/1998 | Teng | 726/25 |
| 5,819,155 A | 10/1998 | Worthy et al. | |
| 5,838,774 A | 11/1998 | Weisser, Jr. | |
| 5,852,775 A | 12/1998 | Hidary | |
| 5,875,401 A | 2/1999 | Rochkind | |
| 5,889,953 A | 3/1999 | Thebaut et al. | 709/221 |
| 5,903,636 A | 5/1999 | Malik | |
| 5,949,867 A | 9/1999 | Sonnenberg | |
| 5,961,593 A | 10/1999 | Gabber et al. | |
| 5,968,176 A | 10/1999 | Nessett et al. | 726/11 |
| 6,011,975 A | 1/2000 | Emery et al. | |
| 6,028,921 A | 2/2000 | Malik et al. | |
| 6,047,327 A | 4/2000 | Tso et al. | 709/232 |
| 6,055,637 A | 4/2000 | Hudson et al. | 726/20 |
| 6,076,080 A | 6/2000 | Morscheck et al. | 705/400 |
| 6,085,086 A | 7/2000 | LaPorta et al. | |
| 6,091,956 A | 7/2000 | Hollenberg | 455/456.5 |
| 6,101,381 A | 8/2000 | Tajima et al. | |
| 6,112,186 A | 8/2000 | Bergh et al. | 705/10 |
| 6,122,520 A | 9/2000 | Want et al. | 455/456.2 |
| 6,133,853 A | 10/2000 | Obradovich et al. | 340/905 |
| 6,138,003 A | 10/2000 | Kingdon et al. | |
| 6,138,119 A | 10/2000 | Hall et al. | 707/9 |
| 6,157,829 A | 12/2000 | Grube et al. | |
| 6,182,226 B1 | 1/2001 | Reid et al. | 726/15 |
| 6,184,829 B1 | 2/2001 | Stilp | |
| 6,185,426 B1 | 2/2001 | Alperovich et al. | |
| 6,208,854 B1 | 3/2001 | Roberts et al. | |
| 6,208,866 B1 | 3/2001 | Rouhollahzadeh et al. | |
| 6,229,477 B1 | 5/2001 | Chang et al. | |
| 6,233,329 B1 | 5/2001 | Urban et al. | 379/142.1 |
| 6,259,405 B1 | 7/2001 | Stewart | |
| 6,311,069 B1 * | 10/2001 | Havinis et al. | 455/456.4 |
| 6,317,718 B1 | 11/2001 | Fano | 705/1 |
| 6,321,092 B1 * | 11/2001 | Fitch et al. | 455/456.5 |
| 6,324,396 B1 | 11/2001 | Vasa et al. | |
| 6,332,127 B1 | 12/2001 | Bandera et al. | 705/14 |
| 6,337,810 B1 | 1/2002 | Yamasaki et al. | |
| 6,353,664 B1 | 3/2002 | Cannon et al. | |
| 6,377,810 B1 * | 4/2002 | Geiger et al. | 455/456.2 |
| 6,385,591 B1 | 5/2002 | Mankoff | |
| 6,414,635 B1 | 7/2002 | Stewart et al. | 342/457 |
| 6,418,308 B1 | 7/2002 | Heinonen et al. | |
| 6,421,441 B1 | 7/2002 | Dzuban | |
| 6,427,073 B1 * | 7/2002 | Kortesalmi et al. | 455/414.1 |
| 6,442,391 B1 | 8/2002 | Johansson et al. | |
| 6,442,687 B1 | 8/2002 | Savage | 713/156 |
| 6,449,497 B1 | 9/2002 | Kirbas et al. | |
| 6,463,533 B1 | 10/2002 | Calamera et al. | |
| 6,470,378 B1 | 10/2002 | Tracton et al. | |
| 6,470,447 B1 | 10/2002 | Lambert et al. | |
| 6,473,626 B1 | 10/2002 | Nevoux et al. | |
| 6,477,382 B1 | 11/2002 | Mansfield et al. | |
| 6,484,148 B1 | 11/2002 | Boyd | |
| 6,496,931 B1 | 12/2002 | Rajchel et al. | 713/168 |
| 6,505,046 B1 | 1/2003 | Baker | |
| 6,505,048 B1 * | 1/2003 | Moles et al. | 455/456.1 |
| 6,505,049 B1 | 1/2003 | Dorenbosch | |
| 6,505,163 B1 | 1/2003 | Zhang et al. | |
| 6,522,876 B1 | 2/2003 | Weiland et al. | |
| 6,526,275 B1 | 2/2003 | Calvert | 455/418 |
| 6,545,596 B1 | 4/2003 | Moon | |
| 6,546,257 B1 | 4/2003 | Stewart et al. | |
| 6,560,442 B1 | 5/2003 | Yost et al. | |
| 6,560,461 B1 | 5/2003 | Fomukong et al. | |
| 6,594,482 B1 | 7/2003 | Findikli et al. | 455/411 |
| 6,618,474 B1 | 9/2003 | Reese | 379/142.17 |
| 6,618,593 B1 | 9/2003 | Drutman et al. | |
| 6,622,016 B1 | 9/2003 | Sladek et al. | |
| 6,628,928 B1 | 9/2003 | Crosby et al. | |
| 6,628,938 B1 | 9/2003 | Rachabathuni et al. | |
| 6,640,184 B1 | 10/2003 | Rabe | |
| 6,647,257 B2 * | 11/2003 | Owensby | 455/414.1 |
| 6,647,269 B2 | 11/2003 | Hendrey et al. | |
| 6,650,901 B1 | 11/2003 | Schuster et al. | 455/456.1 |
| 6,662,014 B1 * | 12/2003 | Walsh | 455/456.2 |
| 6,675,017 B1 | 1/2004 | Zellner et al. | |
| 6,677,894 B2 | 1/2004 | Sheynblat et al. | |
| 6,701,160 B1 | 3/2004 | Pinder et al. | 455/550.1 |
| 6,716,101 B1 | 4/2004 | Meadows et al. | 455/456.1 |
| 6,725,048 B2 | 4/2004 | Mao et al. | 455/456.2 |
| 6,732,101 B1 | 5/2004 | Cook | 707/10 |
| 6,738,808 B1 | 5/2004 | Zellner et al. | |
| 6,754,504 B1 | 6/2004 | Reed | |
| 6,799,049 B1 | 9/2004 | Zellner et al. | |
| 6,816,720 B2 | 11/2004 | Hussain et al. | 455/404.2 |
| 6,819,929 B2 | 11/2004 | Antonucci et al. | |
| 6,829,475 B1 | 12/2004 | Lee et al. | |
| 6,850,758 B1 | 2/2005 | Paul et al. | |
| 6,867,733 B2 | 3/2005 | Sandhu et al. | |
| 6,868,074 B1 | 3/2005 | Hanson | 370/328 |
| 6,874,011 B1 | 3/2005 | Spielman et al. | 709/206 |
| 6,876,858 B1 | 4/2005 | Duvall et al. | |
| 6,937,869 B1 | 8/2005 | Rayburn | 455/457 |
| 6,954,147 B1 | 10/2005 | Cromer et al. | 340/568.1 |
| 7,005,985 B1 | 2/2006 | Steeves | 340/572.1 |
| 7,023,995 B2 | 4/2006 | Olsson | 380/258 |
| 7,043,231 B2 | 5/2006 | Bhatia et al. | 455/412.1 |
| 7,069,319 B2 | 6/2006 | Zellner et al. | |
| 7,085,555 B2 | 8/2006 | Zellner et al. | |
| 7,103,368 B2 | 9/2006 | Teshima | 455/456.3 |
| 7,106,843 B1 | 9/2006 | Gainsboro et al. | 379/191 |
| 7,110,749 B2 | 9/2006 | Zellner et al. | |
| 7,116,977 B1 | 10/2006 | Moton et al. | 455/419 |
| 7,124,101 B1 | 10/2006 | Mikurak | 705/35 |
| 7,181,225 B1 | 2/2007 | Moton et al. | |
| 7,181,529 B2 | 2/2007 | Bhatia et al. | 709/238 |
| 7,212,829 B1 | 5/2007 | Lau et al. | 455/456.1 |
| 7,245,925 B2 | 7/2007 | Zellner | 455/456.1 |
| 7,260,378 B2 | 8/2007 | Holland et al. | 455/404.2 |
| 7,383,052 B2 | 6/2008 | Moton, Jr. et al. | 455/456.2 |
| 2001/0021646 A1 * | 9/2001 | Antonucci et al. | 455/404 |
| 2001/0034709 A1 | 10/2001 | Stoifo et al. | 705/51 |
| 2002/0037709 A1 | 3/2002 | Bhatia et al. | 455/414 |
| 2002/0037722 A1 | 3/2002 | Hussain et al. | 455/435 |
| 2002/0037731 A1 | 3/2002 | Mao et al. | 455/453 |
| 2002/0037744 A1 | 3/2002 | Bhatia et al. | 455/557 |
| 2002/0037750 A1 | 3/2002 | Hussain et al. | 455/564 |
| 2002/0038362 A1 | 3/2002 | Bhatia et al. | 709/224 |
| 2002/0038386 A1 | 3/2002 | Bhatia et al. | 709/250 |
| 2002/0052781 A1 | 5/2002 | Aufricht et al. | 705/14 |
| 2002/0077083 A1 | 6/2002 | Zellner et al. | |

| | | | |
|---|---|---|---|
| 2002/0077084 A1 | 6/2002 | Zellner et al. | |
| 2002/0077118 A1 | 6/2002 | Zellner et al. | |
| 2002/0077130 A1 | 6/2002 | Owensby | 455/466 |
| 2002/0077897 A1 | 6/2002 | Zellner et al. | |
| 2002/0090932 A1 | 7/2002 | Bhatia et al. | 455/412 |
| 2002/0095312 A1 | 7/2002 | Wheat | 705/1 |
| 2002/0102993 A1 | 8/2002 | Hendrey et al. | |
| 2002/0107027 A1 | 8/2002 | O'Neil | 455/456 |
| 2004/0205198 A1 | 10/2004 | Zellner et al. | |
| 2005/0272445 A1 | 12/2005 | Zellner et al. | |
| 2006/0089134 A1 | 4/2006 | Moton et al. | 455/418 |
| 2006/0094447 A1 | 5/2006 | Zellner et al. | |
| 2006/0099966 A1 | 5/2006 | Moton et al. | 455/456.3 |
| 2006/0105784 A1 | 5/2006 | Zellner et al. | |
| 2006/0167986 A1 | 7/2006 | Trzyna et al. | 709/203 |
| 2007/0010260 A1 | 1/2007 | Zellner | 455/456.1 |
| 2007/0042789 A1 | 2/2007 | Moton et al. | 455/456.1 |
| 2007/0136603 A1 | 6/2007 | Kuecuekyan | 713/185 |
| 2007/0250920 A1 | 10/2007 | Lindsay | 726/7 |
| 2008/0096529 A1 | 4/2008 | Zellner | 455/411 |

FOREIGN PATENT DOCUMENTS

| | | |
|---|---|---|
| JP | 1-194628 | 8/1989 |
| JP | 3-128540 | 5/1991 |
| JP | 7-234789 | 9/1995 |
| JP | 7-288514 | 10/1995 |
| JP | 7-319706 | 12/1995 |
| JP | 8-44568 | 2/1996 |
| JP | 8-87296 | 4/1996 |
| WO | WO 98/19484 | 5/1998 |
| WO | WO 99/27716 | 6/1999 |
| WO | PCT/US01/22295 | 7/2001 |

OTHER PUBLICATIONS

U.S. Official Action dated May 7, 2003 cited in U.S. Appl. No. 09/740,373.
U.S. Final Official Action dated Oct. 21, 2003 cited in U.S. Appl. No. 09/740,373.
U.S. Official Action dated Jan. 26, 2004 cited in U.S. Appl. No. 09/740,373.
U.S. Official Action dated Apr. 28, 2005 cited in U.S. Appl. No. 09/740,373.
U.S. Official Action dated Mar. 1, 2003 cited in U.S. Appl. No. 09/740,375.
U.S. Final Official Action dated Sep. 24, 2004 cited in U.S. Appl. No. 09/740,375.
U.S. Official Action dated Feb. 28, 2005 cited in U.S. Appl. No. 09/740,375.
U.S. Final Official Action dated Jul. 26, 2005 cited in U.S. Appl. No. 09/740,375.
Copending U.S. Appl. No. 10/252,039 entitled "Identity Blocking Service from a Wireless Service Provider," filed Oct. 17, 2005.
U.S. Official Action dated Oct. 4, 2005 cited in U.S. Appl. No. 10/819,940.
Microsoft Mobility Developer Conference 2003.
3$^{rd}$ Generation Partnership Project; Technical Specification Group Services and System Aspects; Functional Stage 2 Description of Location Services in UMTS (1999).
http://www.openwave.com/us/news_room/press_releases/2001/20010320 "Open Wave Announces Availability to End-to-End Set of Location Services for Wireless Internet".
Co-pending U.S. Appl. No. 09/739,315, filed Dec. 19, 2000.
Co-pending U.S. Appl. No. 09/630,134, filed Aug. 1, 2000.
Co-pending U.S. Appl. No. 09/739,162, filed Dec. 19, 2000.
Co-pending U.S. Appl. No. 09/739,340, filed Dec. 19, 2000.
Co-pending U.S. Appl. No. 10/819,940, filed Apr. 8, 2004.
Co-pending U.S. Appl. No. 09/740,414, filed Dec. 19, 2000.
Co-pending U.S. Appl. No. 09/740,372, filed Dec. 19, 2000.
Official Action dated May 16, 2003 in U.S. Appl. No. 09/740,372.
Official Action dated Oct. 30, 2003 in U.S. Appl. No. 09/740,372.
Official Action dated Apr. 15, 2004 in U.S. Appl. No. 09/740,372.
Final Official Action dated Nov. 2, 2004 in U.S. Appl. No. 09/740,372.
Official Action dated Nov. 10, 2003 in U.S. Appl. No. 09/740,414.
Final Official Action dated Apr. 21, 2004 in U.S. Appl. No. 09/740,414.
Official Action dated Oct. 5, 2004 in U.S. Appl. No. 09/740,414.
Official Action dated Jun. 21, 2004 in U.S. Appl. No. 09/739,315.
Final Official Action dated Feb. 9, 2005 in U.S. Appl. No. 09/739,315.
Official Action dated Nov. 10, 2003 in U.S. Appl. No. 09/739,162.
Official Action dated Mar. 9, 2004 in U.S. Appl. No. 09/739,162.
Official Action dated Sep. 9, 2004 in U.S. Appl. No. 09/739,162.
Official Action dated Mar. 12, 2004 in U.S. Appl. No. 09/739,340.
Official Action dated Dec. 10, 2004 in U.S. Appl. No. 09/739,340.
Official Action dated Feb. 12, 2003 in U.S. Appl. No. 09/630,134.
Final Official Action dated Jul. 10, 2003 in U.S. Appl. No. 09/630,134.
Official Action dated Jun. 7, 2004 in U.S. Appl. No. 09/630,134.
Official Action dated Jan. 13, 2005 in U.S. Appl. No. 09/630,134.
U.S. Appl. No. 09/740,414, filed Dec. 19, 2000, entitled "Location Blocking Service from a Wireless Service Provider", Inventors: Zellner et al.
"Wireless Application Protocol", Oct. 1999 Wireless Internet Today pp. 1-20.
Mark Moeglein, er al., "An Introduction to Snap Track Server-Aided GPS Technology" available at http://www.snapstrack.com/atwork.html.
"Signal Soft Wireless Location Services", available at http://www.signalsoftcorp.com/products/location_manager.html.
Copending U.S. Appl. No. 11/959,283, filed Dec. 18, 2007 entitled "Location-Based Security Rules".
U.S. Official Action dated Feb. 3, 2006 cited in U.S. Appl. No. 09/739,315.
U.S. Office Action dated Jan. 9, 2007 cited in U.S. Application No. 11/406,881.
U.S. Office Action dated Jan. 16, 2007 cited in U.S. Appl. No. 11/187,347.
U.S. Official Action dated Mar. 10, 2006 cited in U.S. Appl. No. 11/252,039.
U.S. Final Office Action dated Feb. 6, 2007 cited in U.S. Appl. No. 11/252,039.
U.S. Final Official Action dated Feb. 24, 2006 cited in U.S. Appl. No. 09/630,134.
U.S. Office Action dated Dec. 13, 2007 cited in U.S. Appl. No. 11/528,782.
U.S. Final Office Action dated Jan. 11, 2007 cited in U.S. Appl. No. 11/322,531.
U.S. Final Office Action dated Mar. 18, 2008 cited in U.S. Appl. No. 11/252,039.
U.S. Final Office Action dated Apr. 3, 2008 cited in U.S. Appl. No. 11/589,688.
U.S. Official Action dated Apr. 21, 2006 cited in U.S. Appl. No. 11/322,531.
U.S. Final Office Action dated Apr. 29, 2008 cited in U.S. Appl. No. 09/630,134.
U.S. Office Action dated May 13, 2008 cited in U.S. Appl. No. 11/298,419.
Copending U.S. Appl. No. 12/132,104, filed Jun. 3, 2008 entitled "System and Method for Using Location Information to Execute an Action".
U.S. Final Office Action dated Jul. 19, 2007 in U.S. Appl. No. 11/298,149.
U.S. Official Action dated Sep. 6, 2006 cited in U.S. Appl. No. 09/630,134.
U.S. Office Action dated Sep. 12, 2007 cited in U.S. Appl. No. 11/406,881.
U.S. Office Action dated Sep. 13, 2007 cited in U.S. Appl. No. 11/252,039.
U.S. Final Office Action dated Nov. 15, 2007 cited in U.S. Appl. No. 11/298,419.
U.S. Appl. No. 11/589,688, filed Oct. 30, 2006, entitled "Location Query Service for Wireless Networks".

U.S. Appl. No. 11/516,164, filed Sep. 6, 2006, entitled "System and Method for Using Location Information to Execute an Action".
U.S. Appl. No. 11/528,782, filed Sep. 28, 2006, entitled "System and Method for Using Location Information to Execute an Action".
U.S. Appl. No. 11/298,419, filed Dec. 9, 2005, entitled "System and Method for Using Location Information to Execute an Action".
U.S. Appl. No. 11/298,149, filed Dec. 9, 2005, entitled "System and Method for Using Location Information to Execute an Action".
U.S. Appl. No. 11/522,239, filed Sep. 15, 2006, entitled "System and Method for Using Location Information to Execute an Action".
U.S. Appl. No. 11/300,694, filed Dec. 15, 2005, entitled "System and Method for Using Location Information to Execute an Action".
U.S. Appl. No. 11/375,849, filed Mar. 15, 2006, entitled "Anonymous Location Service for Wireless Networks".
U.S. Appl. No. 11/187,347, filed Jul. 21, 2005, entitled "Location-Based Security Rules".
U.S. Appl. No. 11/406,881, filed Apr. 19, 2006, entitled "Location Blocking Service from a Wireless Service Provider".
U.S. Appl. No. 11/322,531, filed Dec. 30, 2005, entitled "Location Blocking Service from a Web Advertiser".
U.S. Appl. No. 09/740,375, filed Dec. 19, 2000, entitled "Identity Blocking Service from a Web Advertiser".
U.S. Office Action dated Apr. 22, 2005 cited in U.S. Appl. No. 09/739,340.
U.S. Final Office Action dated Apr. 8, 2005 cited in U.S. Appl. No. 09/739,162.
U.S. Office Action dated Jun. 7, 2005 cited in U.S. Appl. No. 09/630,134.
U.S. Final Office Action dated Jul. 26, 2005 in U.S. Appl. No. 09/740,414.
U.S. Office Action dated Dec. 19, 2005 cited in U.S. Appl. No. 09/740,375.
U.S. Office Action dated Feb. 6, 2006 cited in U.S. Appl. No. 09/740,375.
U.S. Final Office Action dated May 19, 2006 cited in U.S. Appl. No. 09/740,375.
U.S. Office Action dated Oct. 5, 2006 cited in U.S. Appl. No. 11/298,149.
U.S. Office Action dated Dec. 15, 2006 in U.S. Appl. No. 11/522,239.
BellSouth "The Real Yellow Pages," Greater Atlanta A-L, 2004 BellSouth Advertising & Publishing Corp.
BellSouth "The Real Yellow Pages," Greater Atlanta M-Z, 2004 BellSouth Advertising & Publishing Corp.
U.S. Final Office Action dated Sep. 10, 2007 cited in U.S. Appl. No. 11/522,239.
Copending U.S. Appl. No. 11/637,369, filed Dec. 12, 2006, entitled "Surveying Wireless Device Users by Location".
U.S. Final Office Action dated Apr. 2, 2007 in U.S. Appl. No. 09/630,134.
U.S. Office Action dated Apr. 6, 2007 in U.S. Appl. No. 11/298,419.
Co-pending U.S. Appl. No. 09/739,315, filed Dec. 19, 2000.
Co-pending U.S. Appl. No. 09/630,134, filed Aug. 1, 2000.
Co-pending U.S. Appl. No. 09/739,162, filed Dec. 19, 2000.
Co-pending U.S. Appl. No. 09/739,340, filed Dec. 19, 2000.
Co-pending U.S. Appl. No. 10/704,775, filed Nov. 12, 2003.
Co-pending U.S. Appl. No. 10/819,940, filed Apr. 8. 2004.
Co-pending U.S. Appl. No. 09/740,414, filed Dec. 19, 2000.
Official Action dated Nov. 10, 2003 in U.S. Appl. No. 09/740,414.
Final Official Action dated Apr. 21, 2004 in U.S. Appl. No. 09/740,414.
Official Action dated Oct. 5, 2004 in U.S. Appl. No. 09/740,414.
Official Action dated Jun. 21, 2004 in U.S. Appl. No. 09/739,315.
Final Official Action dated Feb. 9, 2005 in U.S. Appl. No. 09/739,315.
Official Action dated Nov. 10, 2003 in U.S. Appl. No. 09/739,162.
Official Action dated Mar. 9, 2004 in U.S. Appl. No. 09/739,162.
Official Action dated Sep. 9, 2004 in U.S. Appl. No. 09/739,162.
Official Action dated Feb. 12, 2003 in U.S. Appl. No. 09/630,134.
Final Official Action dated Jul. 10, 2003 in U.S. Appl. No. 09/630,134.
Official Action dated Jun. 7, 2004 in U.S. Appl. No. 09/630,134.
Official Action dated Jan. 13, 2005 in U.S. Appl. No. 09/630,134.
Official Action dated Mar. 12, 2004 in U.S. Appl. No. 09/739,340.
Official Action dated Dec. 10, 2004 in U.S. Appl. No. 09/739,340.
Microsoft Mobility Developer Conference 2003.
$3^{rd}$ Generation Partnership Project; Technical Specification Group Services and System Aspects; Functional Stage 2 Description of Location Services in UMTS (1999).
http://www.openwave.com/us/news_room/press_releases/2001/20010320 "OpenWave Announces Availability to End-to-End Set of Location Services for Wireless Internet".
"Wireless Application Protocol," Wireless Internet Today, Oct. 1999.
"An Introduction to Snap Track™ Server-Aided GPS Technology," available at http://www.snaptrack.com/AtWork/ion.pdf.
"Signal Soft Wireless Location Services," available at http://www.signalsoftcorp.com/products/locationmanager.html.
Co-pending U.S. Appl. No. 09/740,373, filed Dec. 19, 2000.
Co-pending U.S. Appl. No. 09/740,375, filed Dec. 19, 2000.
U.S. Official Action dated Aug. 30, 2005 in U.S. Appl. No. 10/704,775.
U.S. Official Action dated Oct. 4, 2005 in U.S. Appl. No. 10/819,940.
U.S. Official Action dated Mar. 1, 2004 cited in U.S. Appl. No. 09/740,375.
U.S. Final Official Action dated Sep. 24, 2004 cited in U.S. Appl. No. 09/740,375.
U.S. Official Action dated Feb. 28, 2005 cited in U.S. Appl. No. 09/740,375.
U.S. Final Official Action dated Jul. 26, 2005 cited in U.S. Appl. No. 09/740,375.
Petronis, Scott, "Mapping Technology: The Common Thread," Wireless Review, vol. 17, No. 3, pp. 10-14, Feb. 1, 2000, ISSN: 1099-9248.
U.S. Official Action dated May 7, 2003 cited in U.S. Appl. No. 09/740,373.
U.S. Final Official Action dated Oct. 21, 2003 cited in U.S. Appl. No. 09/740,373.
U.S. Official Action dated Jan. 26, 2004 cited in U.S. Appl. No. 09/740,373.
U.S. Official Action dated Apr. 28, 2005 cited in U.S. Appl. No. 09/740,373.
U.S. Official Action dated Dec. 13, 2005 cited in U.S. Appl. No. 09/740,372.
U.S. Official Action dated Nov. 21, 2005 cited in U.S. Appl. No. 09/740,414.

* cited by examiner

LOCATION BLOCKING SERVICE FOR WIRELESS NETWORKS

This is a Continuation application of U.S. application Ser. No. 09/606,534 filed Jun. 30, 2000 now U.S. Pat. No. 6,675,017.

BACKGROUND

1. Field of the Invention

The present invention relates to the field of wireless networks, and in particular, to wireless networks that track the location and identity of wireless network devices.

2. Background of the Invention

Enhanced wireless 911 (E911) services help ensure that wireless telephones provide 911 call centers, or Public Safety Answering Points (PSAPs), with vital information necessary to locate and identify a caller in an emergency. To comply with E911 standards promulgated by the Federal Communications Commission (FCC), wireless network providers will soon be required to track the location and identity information of all wireless callers, with the purpose of providing such information to emergency personnel when a caller dials 911 from a wireless telephone. The FCC's wireless E911 rules require certain Commercial Mobile Radio Services (CMRS) carriers to begin transmission of enhanced location and identity information in two phases. Phase I requires carriers to transmit a caller's telephone number and general location to a PSAP. Phase II requires carriers to provide more precise location information to the PSAP.

Under the FCC rules, wireless networks and the corresponding wireless handheld devices, such as cellular telephones, will provide both the identity and location of the caller to a 911 dispatcher. To provide a caller's identity, the wireless handheld device will furnish a mobile identification number (MIN), indicating in most instances the telephone number of the device. The wireless network and wireless handheld devices will provide the location of callers using a network-based location system (e.g., triangulation), global positioning systems (GPSs) within the handheld devices, or a combination of the two systems.

In emergency situations, quickly communicating this location and identity information is an invaluable, life-saving tool. Indeed, although the location and identity information is generally perceived as private information, the public policy behind the E911 regulations favors disclosing such private information in hopes of administering the aid a caller needs in an emergency. However, outside of emergencies, most wireless device users view their location and identity information as intimately private, and express strong reservations against involuntary and automatic disclosures of such information.

For users of wireless network devices, concerns over privacy are well founded, especially when considering the increasing convergence of wireless communication networks with global computer networks. Wireless networks are now routinely in communication with the global computer network, providing network users with expanded services such as Internet access through their wireless handheld devices. Through this same link, wireless network providers can provide third parties, such as advertising web sites, with the identity and location information that the network provider is (or will be) required to monitor. (As used herein, third party refers to a participant in a transmission other than the wireless handheld device and the wireless network with which the device communicates.) Consequently, third parties would be able to identify a network user and track that user's every movement. Although these third parties may claim that such information merely enables them to profile customers and to present more individualized products or services, a significant portion of network users would agree that such practices are a clear invasion of privacy, ripe for abuse.

FIG. 1 illustrates a typical system architecture linking a wireless network 110 to a global computer network 112. As shown, wireless network 110 is in communication with a plurality of web sites 114 through global computer network 112, and is in wireless communication with a plurality of wireless handheld devices 116. Common examples of wireless handheld devices include cellular telephones, cellular telephones with text messaging capabilities, personal digital assistants (PDAs) such as the Palm Pilot VII™, and interactive text pagers. To comply with E911 standards, wireless network 112 is also in communication with a PSAP 118.

When a wireless handheld device is in operation, wireless network 110 tracks the location and identity of the device. The plurality of wireless handheld devices 116 provide wireless network 110 with their identities, typically as MINs. For tracking location, the system could have individual location systems 120 in the wireless handheld devices 112, a network-based location system 122 within wireless network 110, or could use a combination of both systems 120 and 122. As an example, a typical network-based location system would be a system that calculates triangulation across cell sites or cell sectors. A typical example of a suitable individual location system would be a GPS.

In the future, because wireless network 110 will already be monitoring the locations and identities of the wireless handheld devices 112 for emergency purposes, network service providers will presumably attempt to capitalize on the mandated service by providing the locations and identities to web sites 114. Among other possible applications, web sites 114 will use the valuable information to direct targeted advertisements to the handheld devices 112. For example, web sites 114 may wish to locate wireless handheld devices near a retail store, and send those devices an advertisement encouraging the network users to visit the store. Although the wireless network provider and web site may view this exchange of location information as a legitimate business use, many network users would object.

Thus, in a wireless network that tracks the locations and identities of network handheld devices, the wireless network controls to whom the information is provided, and the recipient of that information ultimately controls how the information is used. As such, network users will understandably question their level of privacy.

SUMMARY OF THE INVENTION

The present invention is a location blocking service for use in wireless networks that track the locations and identities of network users, such as networks complying with the E911 standards. The location blocking service provides a network user with the ability to prevent the location of her wireless handheld device from being disclosed to parties other than the wireless network provider and PSAPs. As such, the network user retains control of her privacy, deciding when and to whom location information will be forwarded.

In wireless networks that track the locations and identities of network users, the location information originates from either a wireless handheld device (e.g., GPS) or the wireless network (e.g., a network-based location system such as triangulation). Therefore, in the preferred embodiment of the present invention, the network user blocks the forwarding of location information in one of two ways: 1) by signaling to the wireless handheld device, if the location information originates from the wireless handheld device, or 2) by signaling to the network, if the location information originates from the wireless handheld device or the network. A signal to the wireless handheld device directs the device not to forward the location information to the network. A signal to the network directs the network not to forward outside of the network location information received from the wireless handheld device. In each case, the direction provides that location information must never be sent, regardless of any requests for location information from external sources, such as web sites in communication with the wireless network through the global computer network.

The primary components of the present invention include a user interface and at least one location block processor. According to the preferred embodiment of the present invention, the primary components include a user interface and a location block device processor provisioned in the wireless handheld device, and a location block network processor provisioned in the wireless network. The user interface accepts user commands to send the signals to the device or network, for example, by the user's own initiative or by the user's responding to prompts from the user interface. For example, the user interface could be a series of menus asking the user to activate or de-activate location blocking.

The location block device processor is in communication with the user interface and a handheld location system in the wireless handheld device. In response to a signal from the user interface requiring the blocking of location information, the location block device processor removes location information from transmissions from the handheld device to the wireless network. Although described herein as separate components, one of ordinary skill in the art would understand that the user interface and location block device processor could be a single component of a wireless handheld device. As used herein, transmission refers the sending of wireless signals carrying information (e.g., text data, voice data, graphical data, and video data) to a destination.

The location block network processor is in communication with the user interface and the network-based location system. Based on commands received from the user interface, the location block network processor removes location information from transmissions before they are forwarded outside of the network, such as to other wireless network handheld devices or to the global computer network. For example, if the location information originates from a handheld location system in the wireless handheld device, the location block network processor could remove the location information from the transmission and substitute dummy information. As used herein, dummy information means any message that disguises location, for example, "unavailable" or no message at all. If the location information originates from a network-based location system, the location block network processor could either de-activate the network-based location system or substitute dummy information for the location information received from the network-based location system.

According to the preferred embodiment of the present invention, a user can block location information for individual transmissions, for specified types of transmissions, or for all transmissions. These various location blocking options could be set up as an initial profile that could be modified directly by the user through the user interface, or could be modified by the network at the request of the user. The user could select the options, for example, by establishing default preferences, by entering commands before each transmission, or responding to prompts before each transmission. For individual transmissions, a user would opt for location blocking through the user interface before completing the transmission. For example, in sending a text page, a user would precede the transmission with a request for location blocking through the user interface. For blocking location for specific types of transmissions, the user would specify through the user interface recipients who would always receive location information. As an example, such a feature would be beneficial for parents who want to know the locations of their children, but do not necessarily want strangers to receive that information as well. For blocking location in all transmissions, the user would enter a one-time command instructing the location block device processor or location block network processor to never forward location information.

A further preferred embodiment of the present invention overrides blocked location information when necessary, for example, if the user dials 911.

A further preferred embodiment of the present invention provides the wireless network location blocking service irrespective of related services, such as an anonymous location service that provides requesters with the number of devices in a particular location, but not with the identities of those devices.

In addition to blocking location, an alternate preferred embodiment of the present invention enables a network user to block her identity.

Accordingly, it is an object of the present invention to provide wireless network users with the ability to block their location information on wireless networks that track location and identity information.

Another object of the present invention is to prevent third parties from learning the location of a wireless network device operating on a wireless network that tracks location and identity information.

Another object of the present invention is to protect the location information of wireless network users while still providing such information to authorized personnel in emergency situations.

These and other objects of the present invention are described in greater detail in the detailed description of the invention, the appended drawings, and the attached claims.

DETAILED DESCRIPTION OF THE INVENTION

The present invention is a location blocking service for use in wireless networks that track the locations and identities of network users. The location blocking service provides a wireless network user with the ability to prevent the location of her wireless handheld device from being disclosed to parties other than the wireless network provider and PSAPs. The present invention contemplates future enhanced digital cellular networks, in which network users will use digital cellular handheld devices to access data from a global computer network, and in which digital cellular network providers will track the identity and location of each network user.

Figure 1:
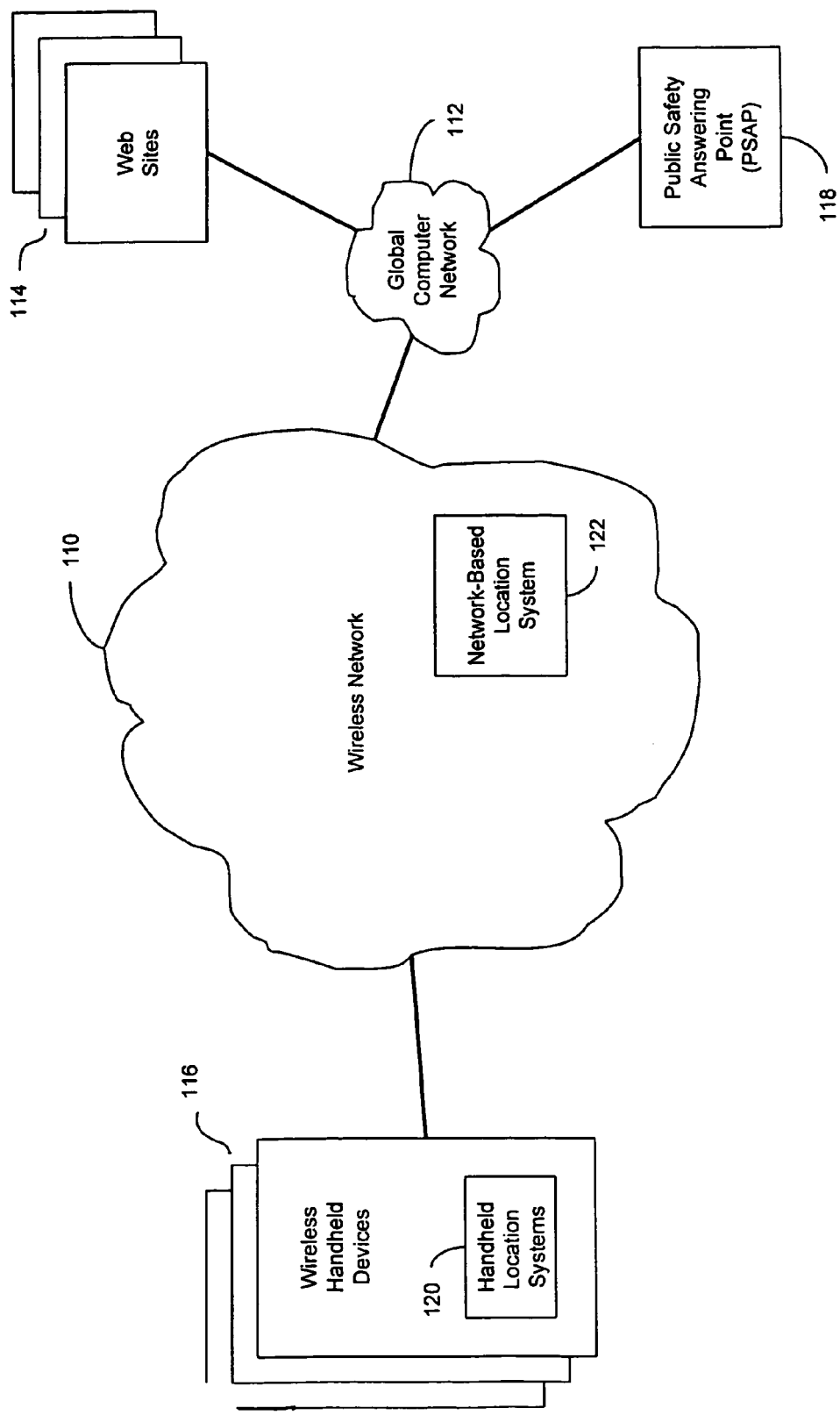
FIG. 1 is a schematic diagram of a prior art wireless network that tracks the locations and identities of network users.
Figure 2A:
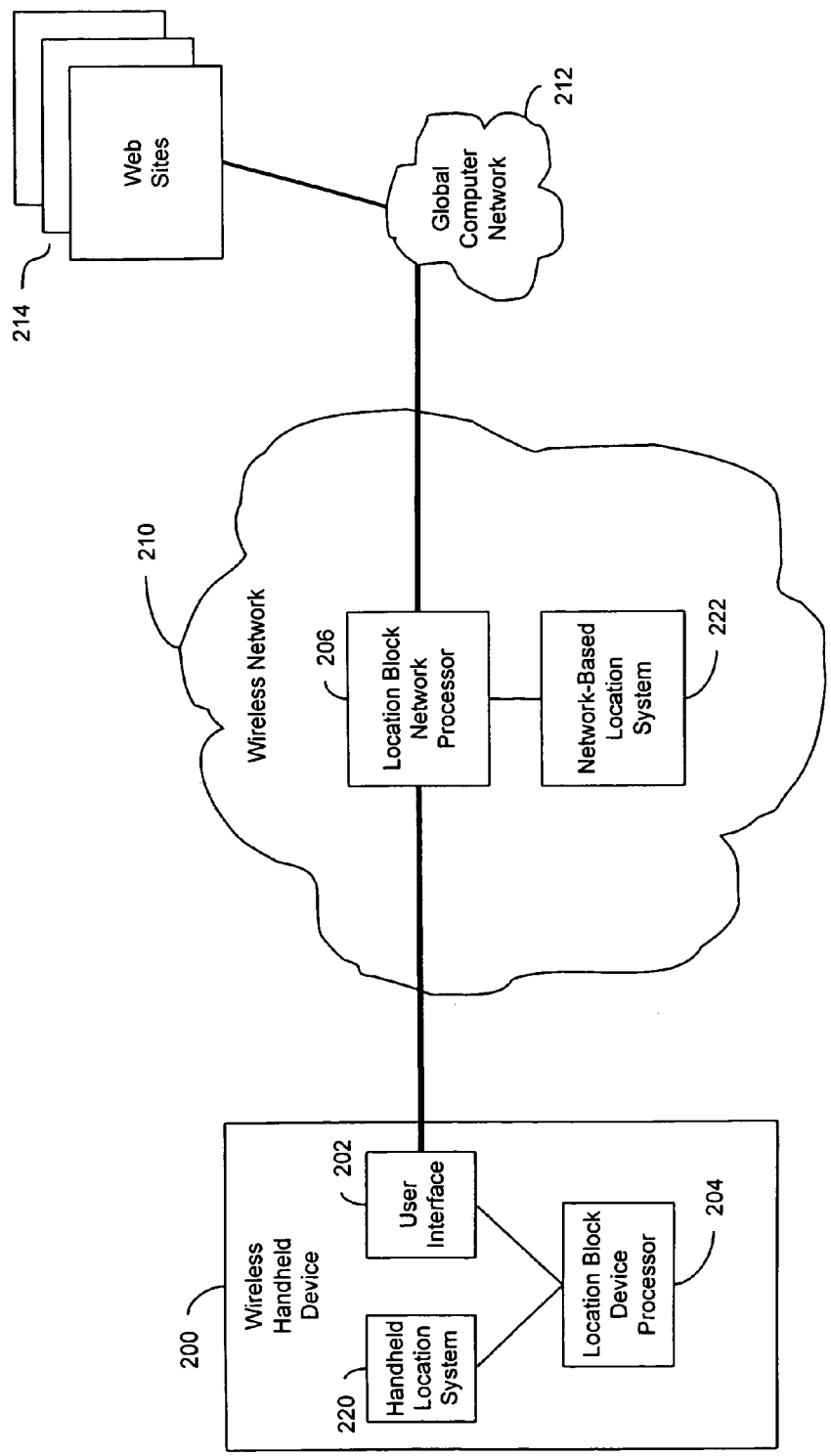
FIG. 2a is a schematic diagram of the system architecture that provides the location blocking service according to a preferred embodiment of the present invention.

Referring to FIG. 2a, in a preferred embodiment of the present invention, the primary components include a user interface 202, a location block device processor 204, and a location block network processor 206. User interface 202 and location block device processor 204 are provisioned in wireless handheld device 200 and are in communication with each other. Location block network processor 206 is provisioned in a wireless network 210. Although FIG. 2a shows one device 200 in communication with wireless network 210, one of ordinary skill in the art would appreciate that, in the context of an entire network, wireless network 210 would be in communication with a plurality of handheld devices, and location block network processor 206 would be in communication with a plurality of user interfaces.

To provide location information, the present invention further includes at least one of a handheld location system 220 provisioned in wireless handheld device 200 and a network-based location system 222 provisioned in wireless network 210. Location block device processor 204 is in communication with handheld location system 220. Location block network processor 206 is in communication with network-based location system 222. To provide a user with expanded services such as Internet access, the present invention further includes web sites 214 in communication with wireless network 210 and location block network processor 206 through global computer network 212.

Wireless handheld device 200 operates over wireless network 210 and provides means by which to exchange text data. Familiar examples include interactive pagers and cellular telephones with text messaging capabilities. Preferably, device 200 is a thin client compatible with Wireless Access Protocol (WAP), which has thin browsers adapted to communicate with location block network processor 206 and to access global computer network 212. Global computer network 212 is preferably the Internet. Web sites 214, which are also preferably compatible with WAP, communicate with device 200 through global computer network 212 and wireless network 210.

WAP is an application environment and set of communication protocols for wireless devices designed to enable manufacturer-, vendor-, and technology-independent access to the Internet and advanced telephony services. WAP provides wireless Internet access through all digital cellular networks, giving network users a menu driven method for downloading information, such as flight schedules and bank account balances, to wireless devices from the Internet.

Handheld location system 220 and network-based location system 222 provide the location of wireless handheld device 200. Depending on the desired degree of accuracy, one or both of the location systems can be used to determine a device's location. The preferred embodiment of handheld location system 220 is a GPS provisioned in wireless handheld device 200. The preferred embodiment of network-based location system 222 is a WAP location service.

User interface 202 is an application that operates on wireless handheld device 200 and enables communication between the user of device 200 and the location block processors 204 and 206. User interface 202 prompts the user of handheld device 200 to enter commands initiating or suspending location blocking. Examples of suitable user interfaces include menu selections, key sequences such as "*82", and graphical user interfaces (provided that the hardware and memory of device 200 support such applications). In accordance with the user's command, user interface 202 alters the way in which the location block processors 204 and 206 operate. User interface 202 recognizes from where location information originates, and communicates with the appropriate location blocking processor. That is, if handheld location system 220 provides the location information, user interface 202 directs either of the location block processors 204 and 206 to withhold the location information. Correspondingly, if network-based location system 222 provides the location information, user interface 202 directs location block network processor 206 to withhold the location information.

Location block device processor 204 and location block network processor 206 are applications that receive and execute commands from user interface 202. Primarily, location block device processors 204 and 206 remove location information. For example, processors 204 and 206 can disable a location system and substitute dummy information or can receive location information and substitute dummy information. Substituting dummy information could comprise substituting no information at all. To block location information, location block device processor 204 either disables handheld location system 220 or substitutes dummy information for the location information that system 220 provides. Location block network processor 206 removes location information from transmissions before they are forwarded outside of wireless network 210, such as to web sites 214 through global computer network 212. If the location information originates from handheld location system 220, location block network processor 206 removes the location information from the transmission and substitutes dummy information. If the location information originates from network-based location system 222, location block network processor 206 either disables network-based location system 222 or substitutes dummy information for the location information received from network-based location system 222.

As one of ordinary skill in the art would understand, location block network processor 206 could be a separate component of wireless network 210, or could be a part of a proxy server that acts as an intermediary between a plurality of handheld devices and global computer network 212 to provide routing selection (i.e., what transport bearer is to be used), access control, addressing, protocol conversion (i.e., WML text to WML binary), caching, and transport interface between wireless and wired networks (e.g., WAP stack to traditional IP stack, HTTP/TCP/IP). Preferably, the proxy server would be associated with or part of a gateway server that separates the wireless network from the Internet. The proxy server could also be associated with a firewall server that protects the wireless network from intrusion via the global computer network.

Based on the system architecture shown in FIG. 2a, the present invention provides location blocking services by several exemplary methods, depending on which location system provides the location information:

1) If both handheld location system 220 and network-based location system 222 provide location information: user interface 202 directs location block network processor 206 not to forward location information.
2) If only handheld location system 220 provides location information: user interface 202 directs either location block device processor 204 or location block network processor 206 not to forward the location information.
3) If only network-based location system 222 provides the location information: user interface 202 directs location block network processor 206 not to forward the location information.

Figure 2B:
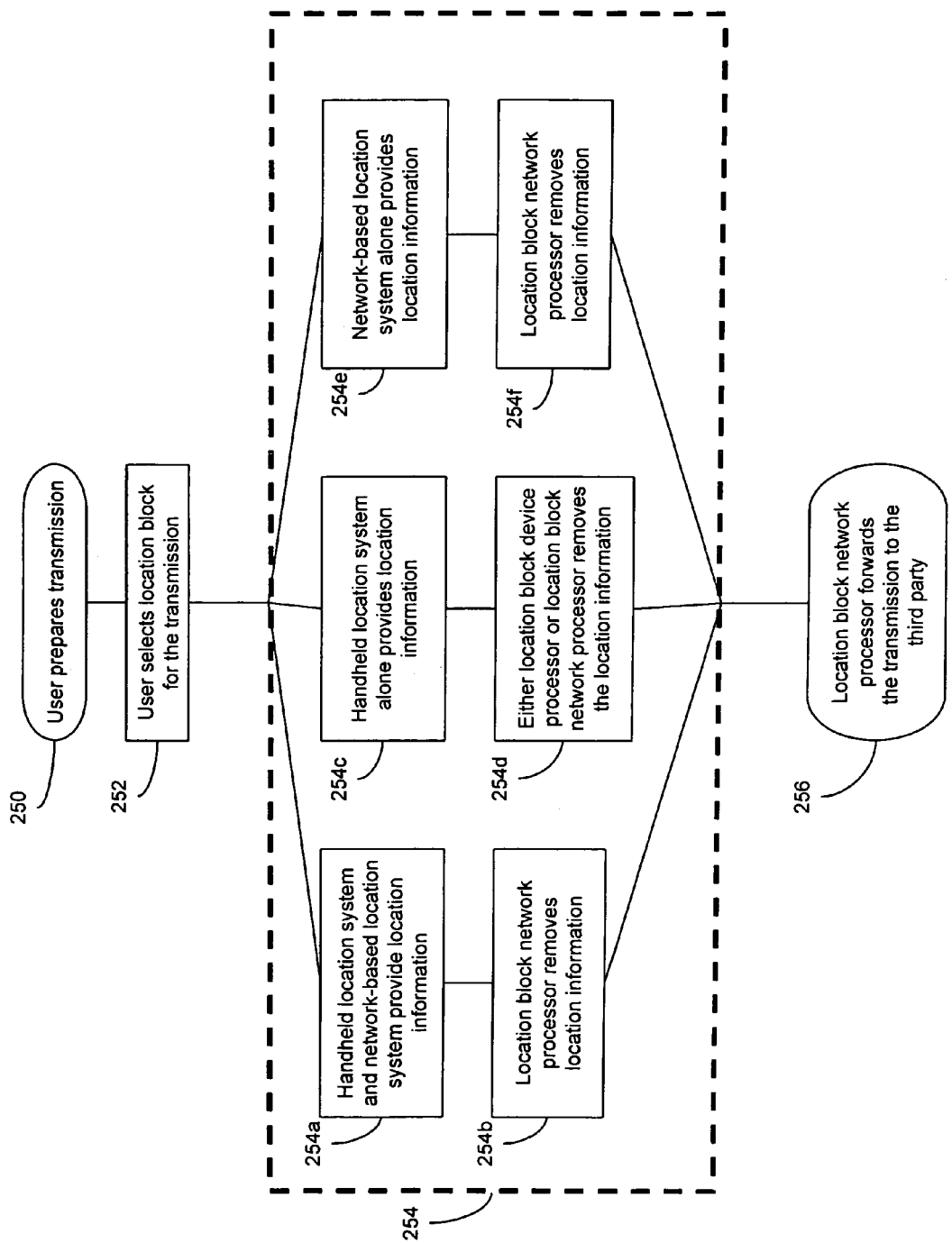
FIG. 2b is a flowchart outlining the method steps of a preferred embodiment of the present invention.

FIG. 2b is a flowchart outlining the method steps of a preferred embodiment of the present invention. While the system operation described herein and illustrated in the diagrams and flowcharts contains many specific details, these specific details should not be construed as limitations on the scope of the invention, but rather as an example of preferred embodiments thereof. As would be apparent to one of ordinary skill in the art, many other variations on the system operation are possible, including differently grouped and ordered method steps. Accordingly, the scope of the invention should be determined not by the embodiments illustrated, but by the appended claims and their equivalents.

Referring to FIGS. 2a and 2b, in step 250, a user prepares a transmission for sending from wireless handheld device 200 to a third party (e.g., web sites 214) through wireless network 210 and global computer network 212.

In step 252, the user specifies that the location information of wireless handheld device 200 be withheld from the transmission. The user enters this command through user interface 202, for example, as a single command to be applied to the transmission or as a universal command to be applied to all transmissions, perhaps as part of the user's profile.

Once the user has requested location blocking, the method of present invention varies depending on which location system provides the location information. As shown in step 254, when both handheld location system 220 and network-based location system 222 provide the location information (step 254a), location block network processor 206 removes the location information (step 254b). When only handheld location system 220 provides the location information (step 254c), either location block device processor 204 or location block network processor 206 remove the location information (step 254d). When only network-based location system 222 provides the location information (step 254e), location block network processor 206 removes the location information (step 254f).

Finally, once the location information has been removed, in step 256 location block network processor 206 forwards the transmission to the third party (e.g., web sites 214). The third party receives the transmission but does not receive the location of wireless handheld device 200.

According to the preferred embodiment of the present invention, user interface 202 provides several options for blocking location information. For example, user interface 202 can prompt a user to block location information before each transmission, or can prompt the user to block location information for all transmissions. For blocking information on all transmissions, the user accesses user interface 202 only once to activate the blocking service, and does not need to revisit user interface 202 unless the user wants to cancel the location blocking. For individual transmissions, the user must specify each time through user interface 202 whether location information should be forwarded.

As another option, user interface 202 can also enable the user to establish a user profile, to be stored preferably in location block device processor 204 or location block network processor 206, as appropriate for the active location system. Processors 204 or 206 preferably include a database to store the profiles. The profile specifies conditions under which location information is blocked. These conditions can include such parameters as the recipient of the transmission, the time of day, and the location of the user (i.e., if the user never wants to be caught in a particular location, she can specify that that location never be forwarded). User interface 202 allows the user to establish, edit, enable, and disable the profile. When the profile is enabled, the location block processor responsible for blocking the location information (processor 204 or 206) evaluates the transmission to see if it meets the profile parameters, and if so, removes the location information. Thus, for example, if a user has specified that recipients other than his employer do not receive location information, location block processor 204 or 206 reads each data transmission to ascertain the recipient, compares the recipient to the names of the user's employers in the profile, and withholds the location information if the recipient's name does not match those names (of the employers) listed in the profile.

Figure 3:
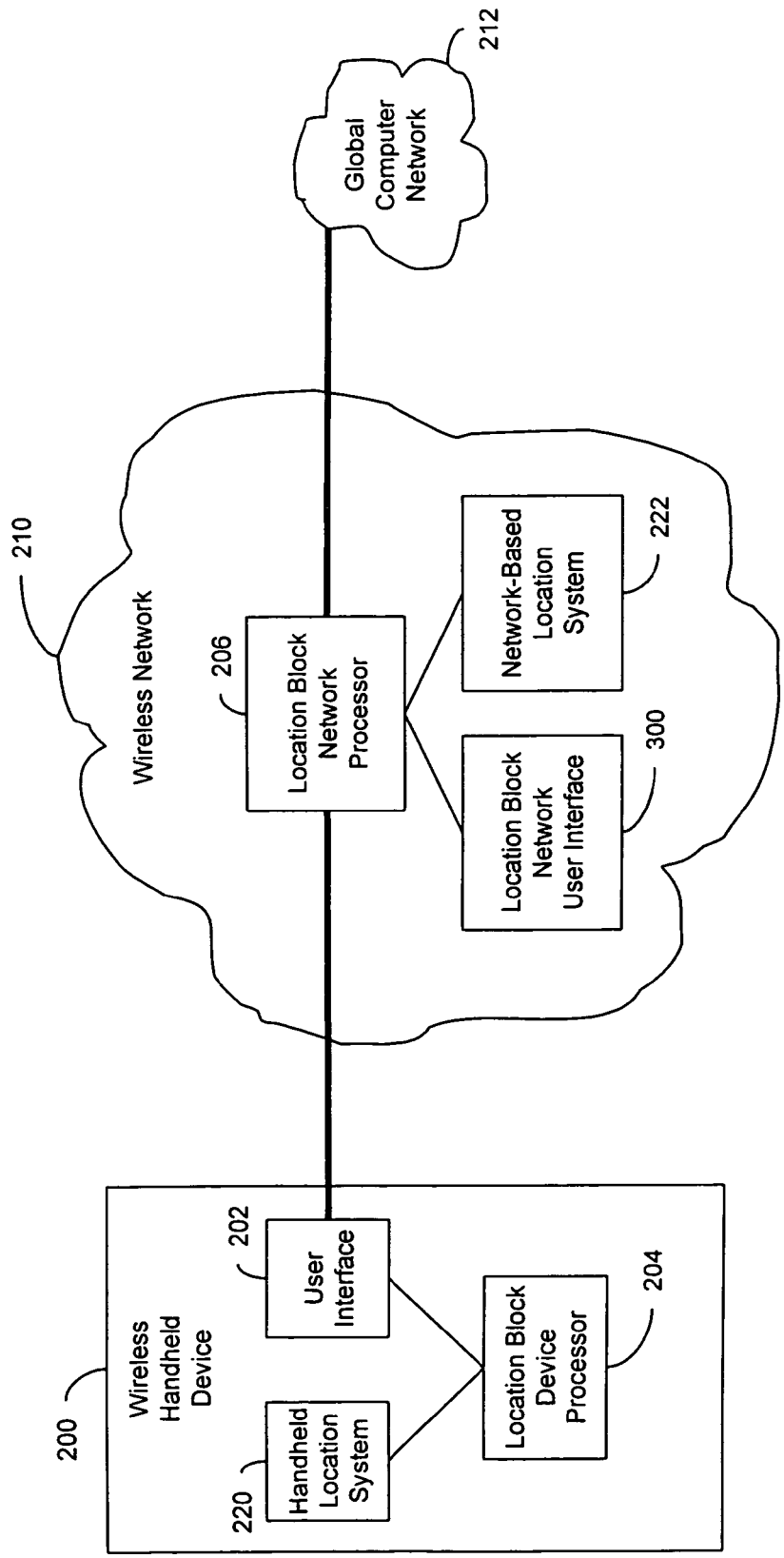
FIG. 3 is a schematic diagram of an alternate preferred embodiment of the present invention in which a location block user interface is provisioned in the wireless network.

FIG. 3 illustrates an alternate preferred embodiment of the present invention in which a location block network user interface 300 is provisioned in wireless network 210, in communication with location block network processor 206. Location block network user interface 300 provides an alternate means of initiating or suspending location blocking and for altering user profiles. Unlike user interface 202, which operates on device 200, location block network user interface 300 operates within wireless network 210. For example, a suitable location block network user interface 300 could be an interactive voice response (IVR) system. A network user would call the IVR system, listen to the menu choices, and use her touch-tone telephone to activate or de-activate location blocking. As another example, location block network user interface 300 could be a web-enabled graphical user interface accessible by a network user through global computer network 212. In this manner, a user would access the web page of the graphical user interface and change the parameters to effect the desired location blocking service. This web accessible interface would be especially beneficial for users who prefer to establish location blocking for certain recipients only, because such a service would require a considerable amount of detailed input by the user.

According to an alternate preferred embodiment of the present invention, location block processors 204 and 206 are programmed to override blocked location information when necessary. For example, even if the user has chosen to block location information for all transmissions, location block processors 204 and 206 automatically reactivate the location service if the user dials 911 so that a PSAP receives the critical location information.

In another alternate preferred embodiment, the present invention provides the wireless network location blocking service irrespective of related services, such as an anonymous location service that provides requesters with the number of devices in a particular location, but not with the identities of those devices. Thus, for example, a user who is skeptical that an anonymous location service is truly anonymous, may direct the handheld device or network to withhold the location information as well as the identity information.

In another alternate preferred embodiment, the present invention enables a network user to block her identity, in addition to location information. This added feature would operate similar to conventional systems such as "Caller ID Block", but would be supplemented by the advantages of also withholding location information.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for implementing a location blocking service in a wireless network, the method comprising:

receiving, via a user interface of a wireless handheld device, a request to block location information associated with the wireless handheld device, wherein the request to block the location information is associated with at least one condition comprising at least one of the following: a time and a current user location;

storing the at least one condition under which the location information is to be blocked in a user profile;

receiving, at a location block processor, the request to block the location information;

determining, at the location block processor, whether a transmission meets the at least one condition; and in response to the location block processor determining that the transmission meets the at least one condition, the location block processor:

blocking the location information from being included in the transmission:

disabling a location system that generates the location information; and forwarding the transmission without the location information to the wireless network.

2. The method of claim 1, wherein the location block processor disabling the location system comprises at least one of the location block processor disabling a handhold location system in the wireless handhold device and the location block processor disabling a network-based location system in the wireless network.

3. The method of claim 1, wherein forwarding the transmission without the location information comprises forwarding the transmission with dummy information instead of the location information.

4. A method for implementing a location blocking service in a wireless network, the method comprising:

receiving, via a user interface of a wireless handheld device, a request to block location information associated with the wireless handheld device from being transmitted to a third party, wherein the request to block the location information is associated with at least one condition comprising at least one of the following: a time and a current user location;

storing the at least one condition under which the location information is to be blocked in a user profile;

receiving, at a location block processor, the request to block the location information;

the location block processor disregarding the request to block the location information if the third party is a public safety answering point (PSAP);

the location block processor determining whether a transmission meets the at least one condition;

if the third party is not a PSAP and, in response to determining that the transmission meets the at least one condition, the location block processor:

blocking the location information from the transmission;

disabling a location system that generates the location information; and providing the transmission to the third party without any location information.

5. The method of claim 4, wherein the PSAP is a 911 call center.

6. The method of claim 4, wherein the request to block the location information applies to the transmission and subsequent transmissions, and the method further comprises:

receiving, via the user interface, a request to stop blocking the location information in the subsequent transmissions;

enabling the location system to generate the location information; and forwarding the subsequent transmissions that include the location information to subsequent third parties.

7. The method of claim 4, wherein the request to block the location information includes a request to block identity information and the step of the location block processor disabling the location system further comprises the location block processor removing the identity information from the transmission.

8. A system comprising:

a location system that provides location information of a wireless handheld device in a wireless network;

a user interface that accepts a request from a user to block the location information, wherein the request to block the location information is associated with at least one condition comprising at least one of the following: a time and a user location;

a storage medium for storing the at least one condition under which the location information is to be blocked in a user profile; and a location block processor in communication with the user interface, wherein the location block processor receives directions from the user interface to:

determine whether a transmission meets the at least one condition, and in response to determining that the transmission meets the at least one condition:

block the location information from a transmission;

disable the location system from generating the location information; and forward the transmission without any location information to a third party.

9. The system of claim 8, wherein the location system and the location block processor are provisioned in the wireless handheld device.

10. The system of claim 8, wherein the location block processor is provisioned in the wireless network.

11. The system of claim 8, wherein the location system and the location block processor is provisioned in the wireless network.

12. The system of claim 8, wherein the location system is provisioned in both the wireless handheld device and the wireless network, and the location block processor is provisioned in the wireless network.

13. The system of claim 8, wherein the user interface is provisioned in the wireless handheld device.

14. The system of claim 13, wherein the user interface is a menu selection.

15. The system of claim 13, wherein the user interface is a key sequence.

16. The system of claim 8, wherein the user interface is provisioned in the wireless network.

17. The system of claim 16, wherein the user interface is an interactive voice response system.

* * * * *